United States Patent [19]
Scheps

[11] Patent Number: 5,249,189
[45] Date of Patent: Sep. 28, 1993

[54] TUNABLE LASERS PUMPED BY VISIBLE LASER DIODES

[75] Inventor: Richard Scheps, Del Mar, Calif.

[73] Assignee: The United States of America as represented by the Secretary of the Navy, Washington, D.C.

[21] Appl. No.: 894,508

[22] Filed: May 28, 1992

[51] Int. Cl.⁵ .............................................. H01S 3/10
[52] U.S. Cl. ...................................... 372/20; 372/70; 372/75; 372/69; 372/27
[58] Field of Search ................. 372/20, 69, 70, 75, 372/27

[56] References Cited

U.S. PATENT DOCUMENTS 5,105,434  4/1992  Krupke et al. ........................ 372/69

OTHER PUBLICATIONS

Serreze et al., "High Power, Very Low Threshold, GaInP/AlGa InP Visible Laser Diode", App. Phys. Lett, vol. 58, pp. 2464-2466, 1991.
Payne et al., "LiCaAlF:$Cr^{3+}$: A Promising New Solid-State Laser Material," IEEE J. Quantum Electron. vol. 24, pp. 2243-2252, 1988.
Payne et al., "Laser Performance of LiSrAlF$_6$:$Cr^{3+}$", J. Appl. Phys. vol. 66, pp. 1051-1056, 1989.
Ross, "YAG Laser Operation by Semiconductor Laser Pumping", Proc IEEE, vol. 56, pp. 196-197, 1968.
Scheps et al., "Alexandrite Laser Pumped by Semiconductor Lasers", Appl. Phys. Lett., vol. 56, pp. 2288-2290, 1990.
Scheps et al., "Cr:LiCaAlF$_6$ Laser Pumped by Visible Laser Diodes", IEEE J. Quantum Electron, vol. 27, pp. 1968-1970, Aug. 1991.
Scheps et al., "CW and Q Switched Operation of a Low Threshold $Cr^{3+}$:LiCaAlF$_6$ Laser" IEEE Photonics Tech. Lett., vol. 2, pp. 626-628, 1990.
Scheps et al., "Diode Pumped Cr:LiSrAlF$_6$ Laser" Opt. Lett., vol. 16, pp. 820-822, 1991.
Smith et al., "LiSrGaAlF$_6$:$Cr^{3+}$, a New Laser Material of the Colquiriite Structure", Paper CTH, H1 Conference on Lasers and Electro-Optics (CLEO), Baltimore, May 1991.
Sipes, "A Highly Efficient Nd. YAG Laser End Pumped by a Semiconductor Laser Array", Appl. Phys. Lett. vol. 47, pp. 74-76, 1985.

(List continued on next page.)

Primary Examiner—Georgia Y. Epps
Attorney, Agent, or Firm—Harvey Fendelman; Thomas Glenn Keough

[57] ABSTRACT

A laser having a $Cr^{3+}$ doped Colquiriite mineral host gain element, such as Cr:LiCAF, Cr:LiSAF or Cr:LiS-GAF, is pumped by the pumping beam from at least one visible laser diode to provide tunable laser emission. The $Cr^{3+}$ doped Colquiriite mineral host gain element has an exterior face provided with a dichroic coating highly transmissive to the pumping beam and highly reflective to the tunable laser emission and has an interior face provided with an AR coating antireflective to the tunable laser emission. An output coupler mirror, provided with a coating that is partially reflective to the tunable laser emission, has an appropriate radius of curvature and is appropriately located to concentrate reflected tunable laser emission in a waist in a resonator mode on an exterior face of the $Cr^{3+}$ doped Colquiriite gain element to assure the visible light diode pumping thereof. A lens is disposed to receive the pumping beam to focus it at or near the waist on the exterior face of the $Cr^{3+}$ doped Colquiriite gain element. The lens, the $Cr^{3+}$ doped Colquiriite gain element and the mirror are appropriately configured and predeterminably spaced with respect to each other to assure that pump mode radiation is deposited primarily within the volume defined by said resonator mode to assure responsive pumping by the visible laser diode.

18 Claims, 2 Drawing Sheets

OTHER PUBLICATIONS

Serreze et al., "Low Threshold Strained Layer GaInP-/AlGaInP GRINSCH Visible Diode Lasers", IEEE Photonics Tech, Lett., pp. 397-399 (1991).

Findlay et al., "The Measurement of Internal Losses in 4-Level Lasers", Phys. Lett., vol. 20, pp. 277-278, 1966.

Kubodera et al., "Stable $LiNdP_4O_{12}$ Miniature Laser", Appl. Opt. vol. 18, pp. 884-890, 1979.

Payne et al., "Properties and Performance of the Li-$CaAlF_6$:$Cr^{3+}$ Laser Material," Proc. SPIE vol. 1223, pp. 84-93, 1990.

Woods et al., "Thermomechanical and Thermo-Optical Properties of the $LiCaAlF_6$:$Cr^{3+}$ Laser Material", J. Opt. Soc. Am. B. vol. 8, pp. 970-977 1991.

Stalder et al., "Flashlamp Pumped Cr:$LiSrAlF_6$ Laser", Appl. Phys. Lett., vol. 58, pp. 216-218, 1991.

Kaminski et al., "Luminescence and Stimulated Emission of $Nd^{3+}$ Ion in $Gd_3Sc_2Ga_3O_{12}$ Crystals", Phys. Status Solid, (a) vol. 34, pp. K109-K113, 1976.

Scheps, "Efficient Cr, Nd:$Gd_3Sc_2Ga_3O_{12}$ Laser at 1.06 um Pumped by Visible Laser Diode", Appl. Phys. Lett., 5, pp. 1287-1289, 1991.

Pruss et al., "Efficient $Cr^{3+}$ Sensitized $Nd^{3+}$: Gd ScGa-Garnet Laser at 1.06 $\mu m$." Appl. Phys. B, vol. 28, pp. 355-358, 1982.

Scheps, "Efficient Laser Diode Pumped Nd Lasers", Appl. Opt. vol. 28, pp. 89-91, 1989.

Koechner, *Solid State Laser Engineering*, p. 89, Springer-Verlag, Berlin, 1988.

Serreze et al., "Very Low Threshold, High Power GaInP/AlGaInP Visible Laser Diode", Post-Deadline Paper (CPDP1), CLEO, Baltimore, May 1991.

Zhang et al., "Electronically Tuned Diode-Laser-Pumped Cr:$LiSrAlF_6$ Laser", Opt. Lett. vol. 17, pp. 43-45, 1992.

Scheps, "Cr Doped Solid State Lasers Pumped by Visible Laser Diodes", Optical Materials 1, 1-9, 1992.

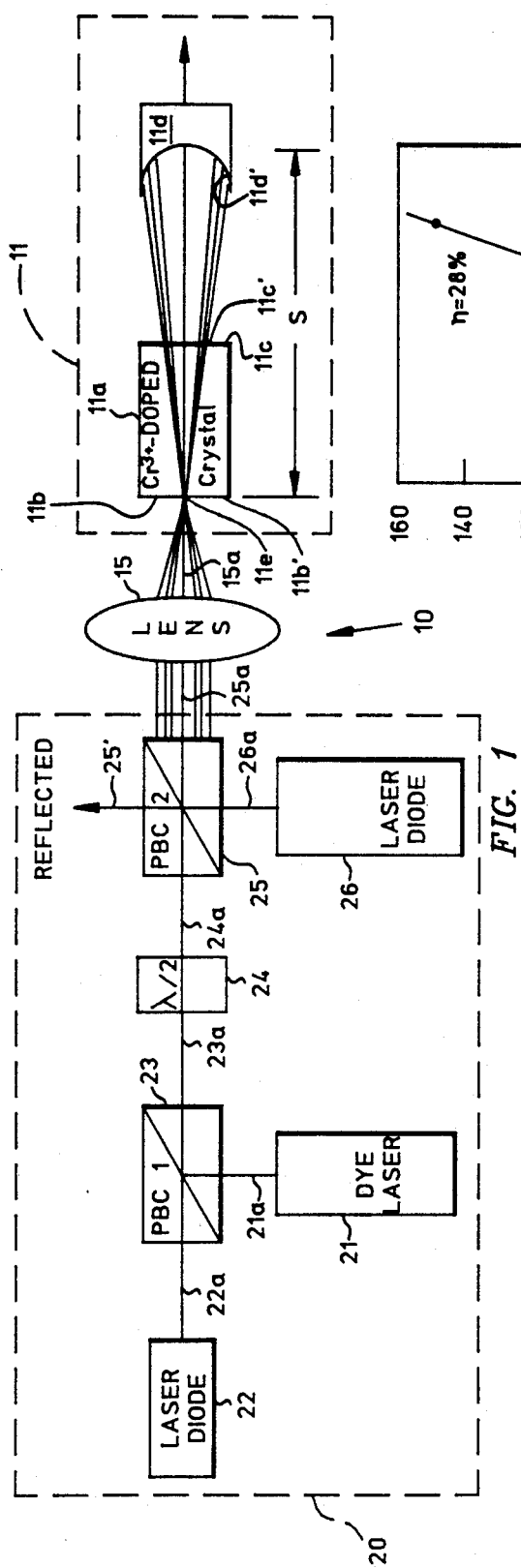
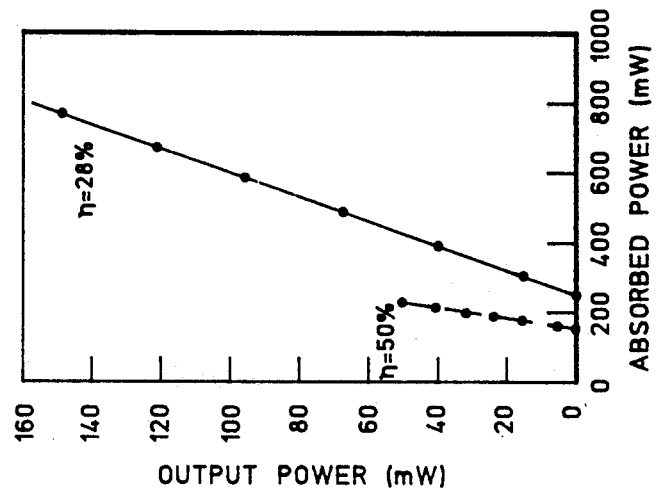
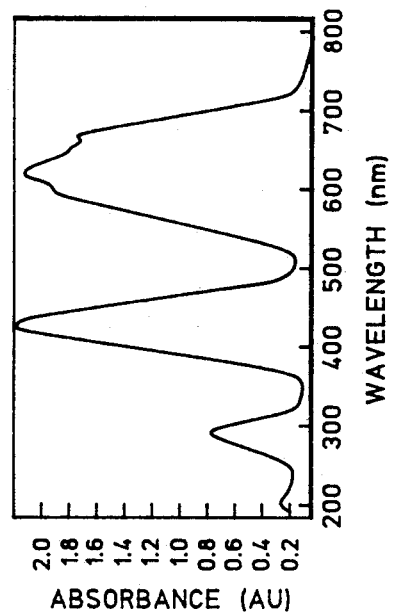
FIG. 1
FIG. 2
FIG. 3

TUNABLE LASERS PUMPED BY VISIBLE LASER DIODES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Diode pumping of Nd:YAG lasers and other rare earth lasers has been an active and productive area of investigation. However, the fixed frequency output of Nd and other rare earth doped lasers makes them a poor choice for applications requiring frequency agility in a compact and efficient device. In addition, the narrow absorption linewidths that are typical of many rare earth-doped lasers restrict the pump bandwidth to 1 or 2 nm. This requires a compromising of the high cost of a narrow linewidth diode array with the low efficiency of a broad bandwidth array. An example of a laser relying on an alexandrite (chromium-doped chrysoberyl ($Cr:BeAl_2O_4$)) gain element is disclosed in U.S. Pat. No. 5,090,019 to Richard Scheps entitled "Laser Diode-Pumped Tunable Solid State Laser".

Thus, a continuing need exists in the state of the art for a solid state laser having a gain medium with broad pump absorption bands, generally speaking in the 610 to 700 nm range, that is pumped by at least one visible laser diode and with an output that is broadly tunable over a range in excess of 100 nm.

SUMMARY OF THE INVENTION

The present invention is directed to providing a laser having a $Cr^{3+}$ doped Colquiriite mineral host gain element, such as Cr:LiCAF, Cr:LiSAF or Cr:LiSGAF, pumped by at least one visible laser diode to provide tunable laser emission. The $Cr^{3+}$ doped Colquiriite mineral host gain element is pumped by the pumping beam from the visible laser diode and has an exterior face provided with a dichroic coating highly transmissive to the pumping beam and highly reflective to the tunable laser emission and has an interior face provided with an AR coating antireflective to the tunable laser emission. A mirror, provided with a coating that is partially reflective to the tunable laser emission, has an appropriate radius of curvature and is appropriately spaced from the exterior face of the $Cr^{3+}$ doped gain element to concentrate reflected tunable laser emission in a resonator mode on the exterior face of the $Cr^{3+}$ doped gain element to assure efficient visible light diode pumping thereof. The mirror has a radius of curvature which may be the same dimension as the spacing between the exterior face of the $Cr^{3+}$ doped gain element and the mirror to concentrate reflected tunable laser emission in a resonator mode in a waist on the exterior face. A lens is disposed to receive the pumping beam to focus it at or near the exterior face of the $Cr^{3+}$ doped gain element. The lens, the $Cr^{3+}$ doped gain element and the mirror are appropriately configured and predeterminably spaced with respect to each other to assure that the population inversion created by the pump beam overlaps the resonator mode to assure responsive pumping by the visible laser diode.

An object of the invention is to provide a higher power laser having a $Cr^{3+}$ doped gain element pumped by at least one visible laser diode.

Another object of the invention is to provide a higher power laser having a $Cr^{3+}$ doped gain element pumped by at least one visible laser diode with higher slope efficiency and lower threshold power.

Another object of the invention is to provide a higher power laser having a $Cr^{3+}$ doped gain element pumped by at least one visible laser diode to assure efficient emission with little regard for the diode pump wavelength.

Another object of the invention is to provide a higher power laser having a $Cr^{3+}$ doped gain element pumped by at least one visible laser diode to assure efficient emission with little regard for the diode pump wavelength so that thermal control of the diode junction temperature is not necessary.

Another object of the invention is to provide a laser having a $Cr^{3+}$ doped Colquiriite mineral host gain element pumped by at least one visible laser diode to provide tunable laser emission.

Another object of the invention is to provide a laser having a $Cr^{3+}$ doped Colquiriite mineral host gain element, such as $Cr:LiCaAlF_6$ (Cr:LiCAF), pumped by at least one visible laser diode to provide tunable laser emission.

Another object of the invention is to provide a laser having a $Cr^{3+}$ doped Colquiriite mineral host gain element, such as $Cr:LiSrAlF_6$ (Cr:LiSAF) pumped by at least one visible laser diode to provide tunable laser emission.

Another object of the invention is to provide a laser having a $Cr^{3+}$ doped Colquiriite mineral host gain element, such as $Cr:LiSrGaF_6$ (Cr:LiSGAF) pumped by at least one visible laser diode to provide tunable laser emission.

Another object of the invention is to provide an improved pump configuration which consists of two polarization beam combiner cubes and a half-wave plate, thereby allowing three lasers to pump the gain element simultaneously.

These and other objects of the invention will become more readily apparent from the ensuing specification and drawings when taken in conjunction with the appended claims.

BRIEF DESCRIPTION OF THE DRAWINGS

FIG. 1 shows a configuration of the pump and resonator optics in which two polarizing beam-splitter cubes (PBC) are used to allow three optical sources to pump the Cr -doped laser simultaneously and a $\lambda/2$ plate rotates the polarization of the two sources transmitted by PBC 23 to determine the fraction of each transmitted by PBC 25.

FIG. 2 depicts a low resolution (2 nm) absorption spectrum of a Cr:LiCAF crystal used in which the ordinate indicates the sample absorbance as an optical density, $\log_{10}(I_0/I)$.

FIG. 3 shows the output power for Cr:LiCAF obtained by pumping with a 60 $\mu$ stripe laser diode (solid) and a dye laser (dashed) and a 98.7% R output coupler.

Quoted power for pulsed operation refers to flat section of laser output pulse following termination of relaxation oscillations. Diode pump power is 1 W.

Figure 6:
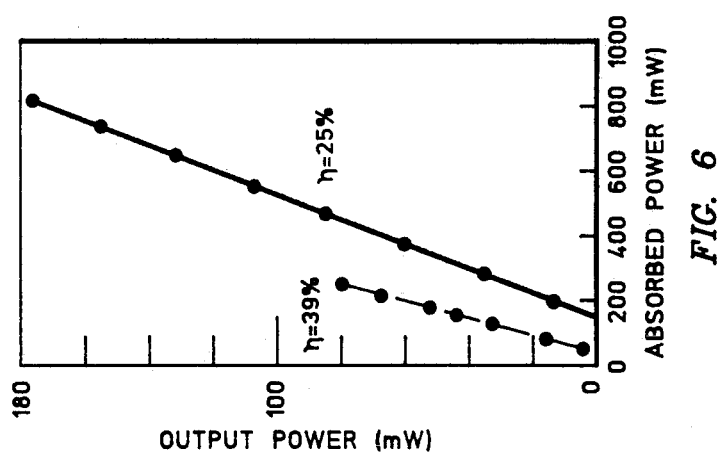

FIG. 6 shows the output power as a function of absorbed pump power for Cr:LiSAF shown for the narrow (dashed) and broad (solid) stripe laser diodes. Pulsed data is shown; cw data is coincident with pulsed up to the cw power limit.

Figure 7:
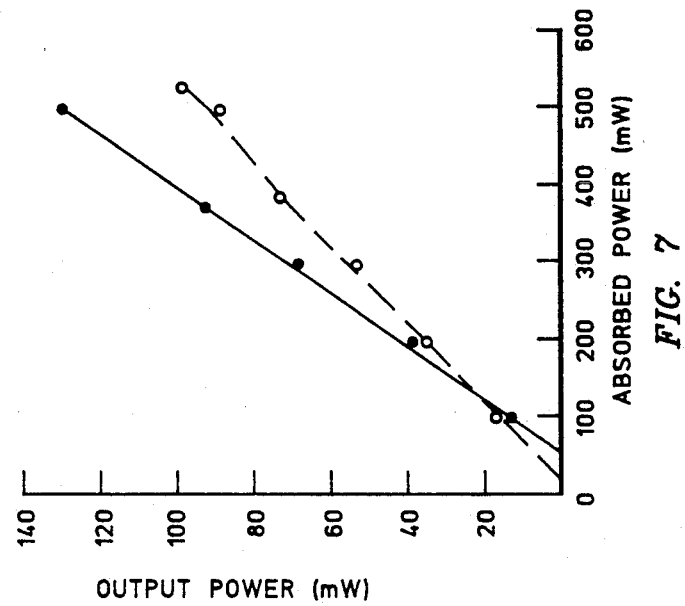

FIG. 7 shows the slope efficiency obtained for Cr:LiSGAF with two different output mirrors, each producing a different laser wavelength. Filled and open circles represent data taken for output wavelengths of 809.7 nm and 832.2 nm, respectively. Solid and dashed lines are linear regression fits to 809.7 nm and 832.2 nm data, respectively. The best slope efficiency was 26%, obtained with a 99.35% reflective mirror at 809.7 nm. The lower slope efficiency and threshold obtained at 832.2 nm are due to the higher reflectivity of the output coupler (reflectivity was measured to be 99.65%)

DESCRIPTION OF THE PREFERRED EMBODIMENT

This inventive concept involves the pumping of $Cr^{3+}$-doped vibronic lasers with visible laser diodes. It has been found that such devices are broadly tunable and have strong absorption in the region of the pump wavelength. The evolution of laser diode pumping of these lasers has benefitted from the recent introduction of single stripe diodes producing as much as 1 W at room temperature, see H. B. Serreze et al.'s. "High power, very low threshold. GaInP/AlGaInP visible laser diodes", *Appl. Phys. Lett.* vol. 58, pp. 2464–2466, 1991 and the development of new, more efficient hosts for the $Cr^{3+}$ ion based on the Colquiriite mineral $LiCaAlF_6$, see S. A. Payne et al.'s "Laser performance of $LiSrAlF_6:Cr^{3+}$", *J. Appl. Phys.* vol. 66, pp. 1051–1056, (1989) and S. A. Payne et al.'s "Laser Performance of $LiSrAlF_6:Cr^{3+}$", *J. Appl. Phys.* vol. 66, pp. 1051–1056, (1989).

In accordance with this inventive concept, a novel laser is fabricated which relies on a laser diode pumped operation of a suitable $Cr^{3+}$ doped Colquiriite mineral host gain element, such as $Cr:LiCaAlF_6$ (Cr:LiCAF), $Cr:LiSrAlF_6$ (Cr:LiSAF) and $Cr:LiSrGaF_6$ (Cr:LiSGAF). In addition, other suitable $Cr^{3+}$ doped Colquiriite mineral host gain elements could be selected.

While the early results of diode pumping Nd:YAG were demonstrated over twenty years ago, see M. Ross', "YAG laser operation by semiconductor laser pumping", *Proc. IEEE*, vol. 56, pp. 196–197, 1968, the first known $Cr^{3+}$-doped laser pumped by visible laser diodes was reported by R. Scheps et al. in their article "Alexandrite laser pumped by semiconductor lasers", *Appl. Phys. Lett.* vol. 56, pp. 2288–2290, 1990, and in the above cited patent by R. Scheps. for $Cr:BeAl_2O_4$ (alexandrite) only recently.

Since that time and in accordance with this inventive concept, the above identified $Cr^{3+}$ doped Colquiriite mineral host gain elements $Cr:LiCaAlF_6$ and Cr:LiSAF have been successfully diode pumped as reported by R. Scheps in his article, "$Cr:LiCaAlF_6$ laser pumped by visible laser diodes", *IEEE J. Quantum Electron.*, vol. 27 pp. 1968–1970 (1991) and by R. Scheps et al. in their article "Diode-pumped $Cr:LiSrAlF_6$ laser", *Opt. Lett.* vol. 16, pp. 820–822, 1991. These materials are among the most efficient Cr-doped vibronic lasers known, but over two dozen oxide and fluoride laser crystal hosts for the $Cr^{3+}$ ion have been cited by S. A. Payne et al., as noted above. Because of the sensitivity of the chromium ion energy levels to the crystal field of the host, peak laser wavelengths of the various $Cr^{3+}$ crystals range from 750 nm to beyond 1 $\mu$, while tunability for individual lasers can exceed 200 nm. In some crystals, most notably Cr:LiSAF, impurity doping levels of 20% or more have been shown to have little adverse effect on laser performance. For laser diode pumping strong broadband absorption is desired in the 665 to 675 nm region which is combined with low sensitivity of the absorption coefficient to pump polarization. In this regard, the Colquiriite fluorides are ideally suited for diode pumping. Furthermore, the $Cr:LiSrGaAlF_6$ (Cr:LiSGAF) laser crystals reported by L. K. Smith et al. in their article "$LiSrGaAlF_6:Cr^{3+}$, a new laser material of the colquiriite structure", *Paper CThH1, Conference on Lasers and Electro-optics (CLEO)*, Baltimore, May, 1991, continue to expand the available selection of high performance crystal hosts. $Cr:LiSrGaF_6$ (Cr:LiSGAF) has been referred to as the Ga analogue of Cr:LiSAF. Diode pumped operation of Cr:LiSGAF was obtained over the wavelength range of 810 to 855 nm with results regarding threshold power, passive loss and slope efficiency. Cr:LiSGAF is of particular interest because it combines several optical and mechanical properties that are more favorable for laser operation than some of the other Colquiriite laser crystals. The values of the emission cross section, peak wavelength and emission lifetime ($3.3 \times 10^{-20}$, 835 nm, and 88 $\mu s$, respectively), as reported by L. K. Smith supra, are intermediate between those of Cr:LiCAF and Cr:LiSAF. However, Cr:LiSGAF has the lowest melting point and smallest difference in expansion coefficient between the crystallographic a and c axes of all reported Colquiriite crystals. These properties enhance its potential to continue maturation as a high quality tunable laser material.

Referring to FIG. 1 of the drawings, a tunable laser 10 fabricated in accordance with this inventive concept is provided with a resonator 11 including a $Cr^{3+}$ doped Colquiriite mineral host gain element 11a. The $Cr^{3+}$ doped Colquiriite mineral host gain element is located to receive a focussed pumping beam 15a from pumping sources to be described via a lens 15. Focussed pumping beam 15a impinges on an exterior face 11b of $Cr^{3+}$ doped Colquiriite mineral host gain element 11a that has been provided with a dichroic coating 11b' that is highly transmissive to the focussed pumping beam and highly reflective to emissions of the gain element. Gain element 11a also has its interior face 11c provided with an AR coating 11c' that is antireflective to the gain element emission.

Resonator 11 is provided with a mirror 11d having a reflective coating 11d' that is partially reflective to the gain element emission. All the coatings mentioned herein are known and made and applied in accordance with well known practices in this art. Further elaboration is dispensed with to avoid belaboring the obvious.

The mirror is shaped with a predetermined radius of curvature, for example, a 5 cm radius of curvature. The coated surface 11d' of mirror 11d is appropriately separated or spaced a dimension s from exterior face 11b of $Cr^{3+}$ doped Colquiriite mineral host gain element 11a, in this example, separated (s) by approximately 5 cm from the exterior face to concentrate reflected gain element emission in a waist in a resonator mode onto the exterior face of the gain element to help assure a responsive pumping of the gain element.

The mirror's radius of curvature is to be approximately the same as the spacing between the mirror and the exterior face of the gain element. This spacing allows the mirror to concentrate the reflected gain element emission in the resonator mode in a relatively small sized waist 11e on the exterior face.

A lens 15 also is configured and disposed appropriately to receive a pumping beam 25a from pumping beam sources to be described and to focus it as focussed pumping beam 15a at or near waist 11e. The lens, the gain element and the mirror are specifically tailored in accordance with capabilities known in the art and predeterminably spaced with respect to each other to assure that mode matching of the pumping mode by the lens is made to deposit pump energy primarily in the volume of the resonator mode in the gain element to assure responsive pumping of the gain element.

Tunable laser 10 has its $Cr^{3+}$ doped Colquiriite mineral host gain element 11a of resonator 11 suitably pumped by pumping arrangement 20. The pumping arrangement has a dye laser 21 emitting a beam 21a to a polarization beam-splitter 23. A laser diode pumping source 22 emits a beam 22a to polarization beam-splitter 23 which at least partially transmits a composite beam 23a made up of one or both of the beams 21a and 22a to a half wave ($\lambda/2$) plate 24. The half wave plate feeds a polarization rotated composite beam 24a to a polarization beam-splitter 25 which is appropriately disposed to receive and at least partially transmit rotated composite beam 24a and at least a part of a beam 26a emitted from a laser diode pumping source 26. A combined beam 25a, made up of at least a part of rotated composite beam 24a and at least a part of a beam 26a, impinges on lens 15 which appropriately transmits a focussed pumping beam 15a at or near exterior face 11b of $Cr^{3+}$ doped Colquiriite mineral host gain element 11a.

Pumping arrangement 20 is a modified version of a standard configuration referred to by D. L. Sipes in his article "A highly efficient Nd:YAG laser end pumped by a semiconductor laser array", *Appl. Phys. Lett.* vol. 47, pp. 74–76, 1985, and allows three pumping sources to pump the gain element simultaneously. The combination of half-wave ($\lambda/2$) plate 24 and polarization beam-splitter cube 23 serves as a variable attenuator for pump light entering polarization beam-splitter cube 25. By rotating the polarization (as rotated composite beam 24a) of the orthogonally polarized beams (composite beam 23a) transmitted by polarization beam-splitter cube 23, $\lambda/2$ plate 24 determines the fractional reflected power 25' of each that will be reflected by polarization beam-splitter cube 25. The reflected power will not pump $Cr^{3+}$ doped Colquiriite mineral host gain element 11a. In order to operate properly, half-wave plate 24 should provide exactly a one-half wave rotation to the components of composite beam 23a. As a result of this half-wave rotation, the plane polarized beam components will have their plane of polarization rotated by 90°. If the polarization rotation of the components of the composite visible pump beam 23a, effected by half-wave plate 24, is not exactly one half wave, the resulting polarization of each component of composite beam 24a will no longer be plane polarized, but will be elliptical or circular, depending on the exact amount of polarization rotation imparted by half-wave plate 24. It is obvious to one versed in the art that the exact one-half wave rotation of the components of composite beam 23a can be accomplished with a rotation by an integral odd multiple of half-wave rotations. That is, half-wave plate 24 may rotate the polarization of the components of composite beam 23a by any 2n+1 (odd) multiple of half-wave rotations, where n is an integer greater than or equal to 0, to accomplish the identical desired orientation of the polarization of the components of composite pump beam 24a.

Pump arrangement 20 proved remarkably convenient since dye laser 21 could be used for initial alignment of resonator 11, after which the power of dye laser 21 (emitted beam 21a) could be gradually "tuned out" of the pump axis while the laser diode power (emitted beam 22a) was simultaneously "tuned in". In addition, with dye laser 21 off, rotating $\lambda/2$ plate 24 attenuated beam 22a, the laser diode pump power, facilitating threshold and slope efficiency measurements. Another important feature of pump arrangement 20 is that the effects of optical feedback to dye laser 21 caused by reflection of focussed pumping beam 15a from exterior face 11b of $Cr^{3+}$ doped Colquiriite mineral host gain element 11a could be minimized. This was accomplished by operating dye laser 21 well above threshold and rotating $\lambda/2$ plate 24 so that only a small fraction of the pump light is transmitted by polarization beam-splitter cube 25. This feature is important for measuring pump threshold of the $Cr^{3+}$ doped Colquiriite mineral host gain element with dye laser 21 as the threshold power required for the $Cr^{3+}$-doped lasers is generally quite low, while the dye laser output power is highly sensitive to optical feedback near its threshold. For the fluoride gain elements it was found that the polarization of the pump beam did not affect the polarization of the laser output, which was always parallel to the crystallographic c axis. As mentioned above, focussed pumping beam 15a was focused onto the crystal with a 5 cm focal length lens 15.

The optical pathlength for each $Cr^{3+}$ doped Colquiriite mineral host gain element or laser crystal was selected based upon the absorption at the diode pump wavelength. The Cr:LiCAF and Cr:LiSAF crystals were both doped at 2 atom %. The lengths of the fluoride crystals were 7.75 mm and 3.0 mm for Cr:LiCAF and Cr:LiSAF, respectively. A nearly hemispherical resonator geometry in resonator 11 was established for each crystal. The exterior face of gain element 11a had a dichroic coating which was highly reflective (HR) at the laser wavelength and highly transmissive (HT) at the pump wavelength, while the interior face was anti-reflection (AR) coated at the laser wavelength. Data on the operation of the lasers were taken with four different light sources. Dye laser 21 was used to measure the variation of threshold power and slope efficiency with wavelength, and to measure the small signal gain and passive resonator losses. The dye laser operated between 610 and 680 nm. A pair of commercially available index-guided 10 mW visible laser diodes were polarization combined as sources 22 and 26 to demonstrate low threshold power and low sensitivity of the threshold to polarization of the pump beam. The two 10 mW laser diodes operated at 672 and 673 nm, respectively. Due to the broad absorption of the Cr ion, temperature tuning of the diode wavelength was not necessary. This permitted using diode lasers that were commercially packaged and collimated, greatly facilitating alignment. The focused spot diameter was measured to be no greater than 10 $\mu$, the resolution limit of the diagnostic apparatus, not shown. Both diodes were index guided, nominally single mode devices.

Two different high power visible laser diodes were used as sources 22. One was a 15 μ stripe width, gain-guided laser diode which produced 106 mW cw and 265 mW peak power long pulse ("quasi-cw"). The output linewidth was 0.2 nm, centered at 666.8 nm full cw power. The diode architecture is a strained layer single quantum well graded-index separate confinement heterostructure (GRINSCH) design such as that described in H.B. Serreze et al.'s "Low threshold strained layer GaInP/AlGaInP GRINSCH visible diode lasers", IEEE Photonics Tech. Lett. vol. 3, (1991) 397. The coherence properties of this diode were comparable to that of the commercial diodes, producing a similar pump threshold and focused spot size. The other diode pumping source 22 had a 60 μ stripe width and generated up to 300 mW cw and 1 W long pulse. For this pumping arrangement the focused spot size and hence $Cr^{3+}$-doped laser threshold were degraded relative to pumping with the 15 μ stripe width diode. At full power the heatsink (not shown) for laser diode 22 was maintained at approximately 21° C., but active cooling was not required for thermal management or wavelength control. Comparable operation of the diode pumped lasers was obtained using only passive heat exchange with the ambient environment. When used to pump the laser crystal, one of the high power diodes replaced 10 mW diode laser 22 while the other 10 mW diode 26 was replaced with a helium-neon alignment laser. In this arrangement only one polarizing beam-splitter cube was used.

Optical characterization measurements were performed for each resonator. A Findlay-Clay analysis, see the article by D. Findlay and R. A. Clay entitled "The measurement of internal losses in 4-level lasers", *Phys. Lett.*, vol. 20, pp. 277-278, 1966. produced values for the resonator passive loss and small signal gain. To perform such measurements the variation of threshold pump power as a function of output coupling is determined. For a tunable laser the output wavelength is sensitive to the spectral shape of the reflectivity of the output coupler. To ensure the accuracy of the Findlay-Clay data, the laser output wavelength was monitored for each output coupler and only threshold data for the same wavelength were used to determine the resonator loss. To provide additional verification of the Findlay-Clay results, passive resonator losses were determined by measuring the relaxation oscillation frequency as discussed in the article by K. Kubodera et al. entitled "Stable $LiNdP_4O_{12}$ miniature laser", *Appl. Opt.* vol. 18, pp. 884-890, 1979. The output wavelength and bandwidth were measured with a 0.3 meter spectrometer and optical multi-channel analyzer (OMA). The minimum spectral resolution of this system is 0.11 nm.

The performance data taken for using a different $Cr^{3+}$ doped Colquiriite mineral host gain element 11a in resonator 11 are in accordance with this inventive concept.

The Cr:LiCAF laser using a Cr:LiCAF gain element was recently developed at Lawrence Livermore National Laboratories (LLNL) and its performance was shown to compare well with the alexandrite laser, see the first S. A. Payne article cited above. It is similar to alexandrite in tuning range (720-840 nm), peak stimulated emission cross section ($1.2 \times 10^{-20}$ cm$^2$) and spontaneous emission lifetime (175 μs). Additional LLNL work, as reported by S. A. Payne et al in their article, "Properties and performance of the $LiCaAlF_6$:$Cr^{3+}$ laser material", *Proc. SPIE* vol. 1223, pp. 84-93, 1990 showed a slope efficiency of 61% when pumped with a Kr-ion laser at 647 nm. For diode pumping, the uniaxial Colquiriite crystals have two important advantages relative to alexandrite. The first is that the absorption coefficient is less sensitive to pump polarization. This allows efficient polarization combination of pump diodes for end-pumping, and reduced geometrical constraints on 1-D diode array placement for side-pumped rods. The second advantage is the relatively strong absorption of Cr:LiCAF, Cr:LiSAF and Cr:LiSGAF at the diode wavelength. Alexandrite absorbs weakly between 665 and 675 nm, the emission wavelength range preferred by diode manufacturers. Alexandrite absorbs strongly on the R1 line at 680.4 nm, and at wavelengths shorter than 650 nm. The R1 line, which was used for the initial demonstration of diode pumped alexandrite by Scheps, as noted in two of his above cited articles, is narrow and generally requires temperature tuning of the pump diode wavelength to match the absorption band. Wavelengths shorter than 650 nm are currently difficult to achieve with visible laser diodes operating at room temperature.

The Cr:LiCAF was found to be an extremely low-loss material and was grown by L. J. Atherton and J. DeYoreo at LLNL noting the immediately preceding citation above. The Cr:LiCAF crystal 11a was oriented in resonator 11 so that the c axis was parallel to the polarization of output beam 21a of dye laser 21. The low resolution absorption spectrum for the Cr:LiCAF gain element 11a is shown in FIG. 2. The round-trip resonator loss and small signal gain were measured using the Findlay-Clay technique. The loss is $6.1 \times 10^{-4}$ and the double-pass small signal gain was $8.6 \times 10^{-5} P_i(mW^{-1})$, where $P_i$ is the pump power. The linear loss is 0.04% cm$^{-1}$, but the true distributed loss is somewhat lower since the coating losses contribute to the measured loss. The absorbed threshold power using an HR output coupler 11d was found to be constant (13.1 ±1.5 mW) over the wavelength range of dye laser 21. The calculated threshold power was 3.4 mW, somewhat lower than the measured value and is expressed as:

$$P_{th} = \frac{\pi(w_p^2 + w_r^2)\hbar\omega L}{4\sigma\tau} \qquad (1)$$

where $\hbar\omega$ is the pump photon energy, L represents the sum of all intracavity (double pass) losses and includes the output coupling, $w_p$ and $w_r$ are the pump and resonator waists, respectively, $\sigma$ is the stimulated emission cross section, and $\tau$ is the fluorescence lifetime. The transmission of output coupler 11d was 0.06%, and the pump and resonator waists used in Eq. 1 were 5 μ and 50 μ, respectively.

The laser threshold based on absorbed power was virtually the same for both pump polarizations. Owing to the lower absorption coefficient for the perpendicular polarization, the difference in incident pump power required to reach threshold was measured to be 8%. Using the two, 10 mW laser diodes as sources 22 and 26 to pump Cr:LiCAF crystal 11a, the threshold power was identical to that using dye laser 21. The maximum output power obtained using an HR output coupler 11d was 540 μW with a measured slope efficiency of 18%.

Under diode pumped operation the output amplitude gave no indication of temporal spiking, and the output spectrum was stable over time, centered at 795 nm.

These characteristics suggest the low thermal lensing in the gain medium that is referred to in the B. W. Woods et al. article "Thermomechanical and thermo-optical properties of the LiCaAlF$_6$:Cr$^{3+}$ laser material", *J. Opt. Soc. Am.* B, vol. 8, pp. 970-977, 1991.

In order to obtain higher output power and slope efficiency the GRINSCH laser diodes were used as source 22. Each diode was bonded to an open heat sink and its output was readily collimated with a high numerical aperture lens corrected for 665 nm. Using the narrow stripe diode to pump Cr:LiCAF crystal 11a, the best output power was 15.9 mW cw and 51.8 mW (peak) at 10 Hz with 200 μs pulses. The cw results were obtained with a 99.6% R output coupler 11d, and the measured threshold power and slope efficiency were 53 mW and 29.7%, respectively. For pulsed operation a 99.3% output coupler 11d was used, giving 125 mW and 36.5% for the threshold power and slope efficiency, respectively. The broad stripe diode provided significantly higher output power. The output power obtained from the Cr:LiCAF gain element with this diode was 34.5 mW cw and 158 mW pulsed. The pulsed power was obtained with a 98.7% R output coupler 11d, giving a slope efficiency of 27.5% and a threshold power of 257 mW. Using this output coupler and pumping with dye laser 21, a slope efficiency of 50% was obtained. This slope efficiency, the highest achieved for a Cr:LiCAF gain element, is a result of using the 98.7% R output coupler 11d in conjunction with the improved focused spot size of dye laser 11d relative to the broad stripe diode. These results are shown in FIG. 3.

The Cr:LiSAF laser has a tuning range that extends from 780 nm to greater than 1 μ, a peak stimulated emission cross section of $5 \times 10^{-20}$ cm$^2$ and a temperature-independent lifetime for spontaneous emission of 67 μs, see the article by M. Stalder et al. "Flashlamp pumped Cr:LiSrAlF$_6$ laser", *Appl. Phys. Lett.* vol. 58, pp. 216-218, 1991. This tuning range is among the largest known for solid state lasers, enhancing its potential for wavelength specific or frequency agile applications. In contrast to the Ti:sapphire laser, the longer spontaneous lifetime in Cr:LiSAF is important for improved energy storage.

Figure 5:
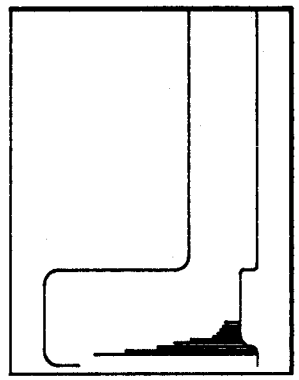
FIG. 5 depicts an oscilloscope trace of the excitation pulse used to drive the pump diode (upper) and the Cr:LiSAF laser output (lower). Time base is 200 $\mu$s per division. Vertical spikes are relaxation oscillations.
Figure 4:
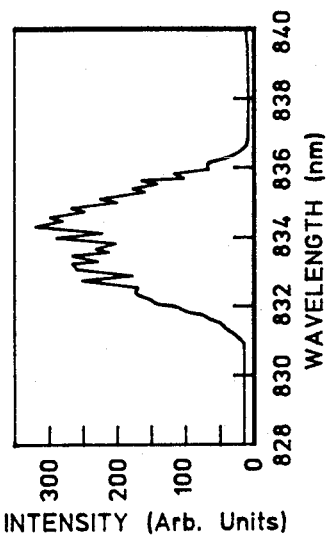
FIG. 4 shows the output spectrum of diode pumped Cr:LiSAF, taken with 0.11 nm resolution.

The incident pump power from two 10 mW laser diodes required as sources 22 and 26 to reach threshold was 14.7 mW and in this regard is similar to that measured for pumping Cr:LiCAF. The absorbed threshold power obtained with dye laser pumping was 8.6 mW. The threshold calculated using Eq. 1 is 2.8 mW, and, as in Cr:LiCAF, the calculated threshold is lower than the measured value. The cause of the discrepancy for both crystals is likely due to the uncertainty in the estimated resonator waist, obtained from beam divergence data. The maximum power from the two laser diodes incident upon the Cr:LiSAF crystal 11a was 16.0 mW, which produced a laser output power of 220 μW. Since the available diode pump power was only slightly higher than the threshold level, the slope efficiency could not be measured. Based on the two measured data points (at threshold and full diode power) the differential optical efficiency is 20% based on absorbed power. The output amplitude gave no indication of temporal spiking, and the output spectrum had a full width at half maximum (FWHM) of 2.6 nm, centered at 834 nm. The spectrum is shown in FIG. 4. Using a 15 μ stripe diode as source 22 and a 98.5% R output coupler, the Cr:LiSAF laser produced 19.9 mW cw and 78 mW pulsed. The slope efficiency was 39%. A 60 μ stripe diode as source 22 produced a slope efficiency of 24.8% with an output coupler of 97.3% R. The highest output power obtained was 26.5 mW cw and 175.8 mW (peak) pulsed. The output waveform is shown in FIG. 5, and the output power data are shown in FIG. 6.

Optical characterization measurements, determined by the Findlay-Clay technique, provided $6.0 \times 10^{-4}$ (0.1% cm$^{-1}$) and $3.2 \times 10^{-4}$P$_f$(mW$^{-1}$) for the loss and gain, respectively. This loss level is among the lowest reported thus far for Cr:LiSAF. The absorbed pump power required to reach threshold was measured as a function of wavelength and found to be constant over the range of 610-680 nm. The slope efficiency using the HR output coupler was also found to be independent of wavelength. The best slope efficiency, obtained with a 97.3% R mirror, was 45.1% based on absorbed power.

The Cr:LiSGAF gain element 11a was doped at 2 atom %. The crystal was 3 mm long and was oriented with the c axis perpendicular to the resonator axis. A nearly hemispherical resonator geometry was used in resonator 11. The Cr:LiSGAF gain element was coated HR at 830 nm and HT at 670 nm on exterior face 11b and coated AR at 830 nm on interior face 11c. Both 5 and 10 cm radius of curvature (ROC) mirrors 11d were used. Data on the performance of the laser were taken with several different light sources. Dye laser 21 was used to measure the threshold power and slope efficiency over a broad pump wavelength range, and to determine the passive resonator losses. The dye laser was tunable between 610 and 680 nm. A pair of commercially available index-guided 10 mW visible laser diodes functioning as sources 22 and 26 were polarization-combined to demonstrate low threshold power and low sensitivity of the threshold power to polarization of the pump beam. The two 10 mW laser diodes operated at 672 and 673 nm, respectively. Due to the broad absorption of the Cr ion, temperature tuning of the diode wavelength was not necessary. This permitted using laser diodes that were commercially packaged and collimated, greatly facilitating alignment. Both laser diodes were index guided, nominally single mode devices.

Two high power visible laser diodes also were polarization-combined as sources 22 and 26. One had a 60 μ wide stripe and generated up to 300 mW cw and 1 W long pulse ("quasi-cw") at 665 nm. The other diode had a 100 μ wide stripe and produced up to 400 mW cw at 690 nm. For these laser diodes the focused spot size was larger and hence the Cr:LiSGAF gain element threshold power was higher than that obtained when pumping with dye laser 21.

Using the 10 mW laser diodes to pump gain element 11a, the measured threshold power was 7.3 mW. Virtually all of the pump light entering the gain element rod was absorbed. The threshold power showed only a modest sensitivity to pump polarization, increasing by less than 10% for the E⊥c polarization component relative to E || c. The output wavelength, which is sensitive to the spectral shape of the reflective coatings, was centered at 854.8 nm and had a width of 8.1 nm. The mirror reflectivity at this wavelength was measured to be 99.99% while the reflectivity of the HR coating 11b' on Cr:LiSGAF crystal 11a was 99.97%. Measured as a function of pump wavelength the threshold power was constant from 610 nm to 680 nm, with an average value of 7.2±0.6 mW. Pumping with a maximum power of 11.4 mW, approximately 30 μW of output power was produced. The low slope efficiency is due to the high reflectivity of the output coupler. The cw output was relatively noise-free.

Optical characterization measurements were performed on the Cr:LiSGAF resonator. Typically, a Findlay-Clay analysis provides values for the passive resonator loss and small signal gain from the variation of the threshold power with output coupling. For a tunable laser with no intracavity wavelength selective elements, the output wavelength may vary when using a series of different output mirrors, see the article by R. Scheps et al. "CW and Q-switched operation of a low threshold $Cr^{+3}$:LiCaAlF$_6$ laser", *IEEE Photonics Tech. Lett.* vol. 2, pp. 626-628, 1990. The Cr:LiSGAF laser output wavelength was monitored for each output coupler and ranged between 809.7 nm and 854.8 nm for the mirrors used as output coupler 11*d*. The magnitude of this variation prevented an accurate Findlay-Clay analysis using the threshold data. Instead, the passive loss was determined by measuring the relaxation oscillation frequency, see the article by K. Kubodera et al. "Stable LiNdP$_4$O$_{12}$ miniature laser", *Appl. Opt.* vol. 18, pp. 884-890, 1979. The round trip loss determined in this manner was $6.6 \times 10^{-3}$ and includes the output coupling. The output coupler used for this measurement produced a peak wavelength of 832.3 nm and its reflectivity was measured to be 99.65%. Accounting for the non-unity reflectivity of the exterior face of the laser rod, the internal resonator loss is $2.8 \times 10^{-3}$. If none of the loss is due to the AR coating on the interior face of the Cr:LiSGAF rod, the distributed loss would be 0.47%/cm.

To obtain higher output power, two broad stripe visible diodes used as sources 22 and 26 were polarization-combined. The best slope efficiency was 26%, obtained with a 99.35% reflective mirror at 809.7 nm. With both diodes operating at full cw power, 560 mW of pump power was incident on the rod and 129.7 mW of output was produced. The full width of the output spectrum was 2.2 nm. Good performance was also obtained closer to the peak output wavelength at 832.3 nm. Using the output coupler engaged to perform the relaxation oscillation frequency measurement, a slope efficiency of 19% was measured and the maximum output power was 98.8 mW. The lower performance at this wavelength relative to 809.7 nm is due to the higher mirror reflectivity. The two slope efficiencies are shown in FIG. 7. The slope efficiencies obtained in this work are lower than that reported in the above identified article by Smith et al., where almost 52% was achieved. This is expected considering the size of the pump waist for the broad stripe visible diode relative to that for the krypton ion pump laser used by Smith et al.

The properties and electrical efficiency of visible laser diodes will improve and it is important to note that the overall electrical efficiency of about 2% is obtained without active cooling of the diodes. For Nd:YAG gain elements, the laser diodes must be cooled both for thermal management and pump wavelength control. Including the power consumed by cooling dramatically lowers the overall efficiency for Nd:YAG and is an important concern for efficient power scaling. One reported overall efficiency for diode pumped Nd:YAG gain element was 13%, excluding the cooler power. The total power consumed by both 1 W diodes was 6.71 W, but two Peltier coolers, each using 31.5 W, were required for wavelength control. This brings the overall efficiency down to 1.2%. Had an attempt been made to optimize the efficiency of the cooling components the overall efficiency would have been higher. However, even a well-engineered system designed to maintain the diode junction within a narrow temperature range requires several watts of cooling power for each (cw) watt of optical output produced.

In contradistinction, the ability to pump the broad $Cr^{3+}$ transition in the visible without active cooling is a significant advantage for scaling a laser 10 fabricated in accordance with this inventive concept. Cr:LiCAF, Cr:LiSAF and Cr:LiSGAF gain elements have been pumped by laser diodes with pump power as high as 1 W. Output powers approaching 200 mW were achieved and slope efficiencies of approximately 25% were measured. Higher slope efficiency and lower threshold power were obtained with lower power diodes, demonstrating the potential of these materials to perform well at high pump power density. Passive loss measurements for the laser gain elements described were extremely low. Laser diode pumped operation of a tunable laser 10 having a Cr:LiSGAF gain element 11*a* provided a maximum output power of 129.7 mW at 809.7 nm, and the slope efficiency was 26%. The Cr:LiSGAF gain element laser was pumped with several sources. For maximum power two polarization-combined high power visible laser diodes were used. The results represent the highest cw power reported for a diode-pumped Cr-doped laser. Taken in conjunction with the thermomechanical and crystal growth advantages of Cr:LiSGAF relative to other $Cr^{3+}$-doped Colquiriite laser materials, the diode pumped results obtained in this work indicate that laser diode pumping of a Cr:LiSGAF gain element is an even more efficient and practical tunable laser.

Obviously, many other modifications and variations of the present invention are possible in the light of the above teachings. It is therefore to be understood that within the scope of the appended claims the invention may be practiced otherwise than as specifically described.

I claim:
1. A laser receiving a visible emission pumping beam to provide tunable $Cr^{3+}$ doped Colquiriite mineral laser emission therefrom comprising:
   at least one laser diode emitting said visible emission pumping beam at at least one wavelength between 610 nm and 690 nm;
   a $Cr^{3+}$ doped Colquiriite mineral host gain element being responsive to said visible emission pumping beam throughout said frequency range to emit said $Cr^{3+}$ doped Colquiriite mineral laser emission therefrom and being disposed to receive said visible emission pumping beam having an exterior face provided with a dichroic coating highly transmissive to said visible emission pumping beam and highly reflective to said $Cr^{3+}$ doped Colquiriite mineral laser emission and having an interior face provided with an AR coating antireflective to said $Cr^{3+}$ doped Colquiriite mineral laser emission and
   a mirror provided with a coating that is partially reflective to said $Cr^{3+}$ doped Colquiriite mineral laser emission, said mirror having an appropriate radius of curvature and appropriately spaced from said exterior face of said $Cr^{3+}$ doped Colquiriite mineral host gain element to reflect said $Cr^{3+}$ doped Colquiriite mineral laser emission in a resonator mode concentrated on said exterior face of said $Cr^{3+}$ doped Colquiriite mineral host gain ele- ment to assure a responsive and high efficiency pumping thereof.

2. An apparatus according to claim 1 in which said mirror has a radius of curvature which is approximately the same as the spacing between said exterior face of said $Cr^{3+}$ doped Colquiriite mineral host gain element and said mirror to concentrate said reflected said $Cr^{3+}$ doped Colquiriite mineral laser emission in said resonator mode in a waist on said exterior face to assure a responsive pumping thereof.

3. An apparatus according to claim 2 further including: a lens disposed to receive said visible emission pumping beam to focus it at or near said waist on said exterior face of said $Cr^{3+}$ doped Colquiriite mineral host gain element.

4. An apparatus according to claim 3 in which said lens, said $Cr^{3+}$ doped Colquiriite mineral host gain element and said mirror are configured and predeterminably spaced with respect to each other to assure that pump mode radiation is deposited primarily within said resonator mode to assure a responsive pumping thereof.

5. An apparatus according to claim 4 in which said AR coating on said interior face of said $Cr^{3+}$ doped Colquiriite mineral host gain element is antireflective to said $Cr^{3+}$ doped Colquiriite mineral laser emission and said dichroic coating on said exterior face is greater than 99.9% reflective to said $Cr^{3+}$ doped Colquiriite mineral laser emission and highly transmissive at said visible emission pumping beam between said 610 nm to 690 nm.

6. An apparatus according to claim 5 in which said laser diode emits between 610 nm and 690 nm.

7. A laser receiving a visible emission pumping beam to provide tunable $Cr^{3+}$ doped Colquiriite mineral laser emission therefrom comprising:
a pair of laser diodes each emitting said visible emission pumping beam at at least one wavelength between 610 nm and 690 nm to a polarizing beam combiner that directs said visible emission pumping beam into a waist to assure a responsive pumping;
a $Cr^{3+}$ doped Colquiriite mineral host gain element being responsive to said visible emission pumping beam throughout said frequency range to emit said $Cr^{3+}$ doped Colquiriite mineral laser emission therefrom and being disposed to receive said visible emission pumping beam having an exterior face provided with a dichroic coating highly transmissive to said visible emission pumping beam and highly reflective to said $Cr^{3+}$ doped Colquiriite mineral laser emission and having an interior face provided with an AR coating antireflective to said $Cr^{3+}$ doped Colquiriite mineral laser emission and
a mirror provided with a coating that is partially reflective to said $Cr^{3+}$ doped Colquiriite mineral laser emission, said mirror having an appropriate radius of curvature and appropriately spaced from said exterior face of said $Cr^{3+}$ doped Colquiriite mineral host gain element to reflect said $Cr^{3+}$ doped Colquiriite mineral laser emission in a resonator mode concentrated on said exterior face of said $Cr^{3+}$ doped Colquiriite mineral host gain element to assure a responsive and high efficiency pumping thereof.

8. An apparatus according to claim 7 in which said pair of laser diodes is part of a pumping arrangement that also includes a dye laser being appropriately disposed to focus at or near said waist on said exterior face.

9. An apparatus according to claim 7 which combines the emission of three plane polarized visible emission pumping laser beams operating at approximately the same wavelength into a single composite visible emission pumping beam by using two polarization beam combiners in conjunction with a means for rotating the polarization of said visible emission pumping lasers by one-half wave, the rotating means is located between said two polarization beam combiners and constructed to effect a odd integral multiple one-half wave rotations of said plane polarized visible emission pumping laser beams at the pump beam wavelength.

10. An apparatus according to claim 7 in which said $Cr^{3+}$ doped Colquiriite mineral host gain element is Cr:LiCAF.

11. An apparatus according to claim 7 in which said $Cr^{3+}$ doped Colquiriite mineral host gain element is Cr:LiSAF.

12. An apparatus according to claim 7 in which said $Cr^{3+}$ doped Colquiriite mineral host gain element is Cr:LiSGAF.

13. An apparatus according to claim 1 in which said $Cr^{3+}$ doped Colquiriite mineral host gain element is Cr:LiCAF.

14. An apparatus according to claim 1 in which said $Cr^{3+}$ doped Colquiriite mineral host gain element is Cr:LiSAF.

15. An apparatus according to claim 1 in which said $Cr^{3+}$ doped Colquiriite mineral host gain element is Cr:LiSGAF.

16. A method for pumping a laser with a visible laser diode emission pumping beam to provide $Cr^{3+}$ doped Colquiriite mineral laser emission therefrom comprising:
providing at least one laser diode emitting said visible emission pumping beam at at least one wavelength between 610 nm and 690 nm;
receiving said visible laser diode pumping beam on an exterior face of a $Cr^{3+}$ doped Colquiriite mineral host gain element provided with a dichroic coating highly transmissive to said visible laser diode pumping beam and highly reflective to said $Cr^{3+}$ doped Colquiriite mineral laser emission and having an interior face provided with an AR coating antireflective to said $Cr^{3+}$ doped Colquiriite mineral laser emission;
reflecting said $Cr^{3+}$ doped Colquiriite mineral laser emission with a mirror provided with a partially reflective coating to said $Cr^{3+}$ doped Colquiriite mineral laser emission; and
concentrating said $Cr^{3+}$ doped Colquiriite mineral laser emission with said mirror having an appropriate radius of curvature to concentrate in a waist on said exterior face of said $Cr^{3+}$ doped Colquiriite mineral host gain element reflected said $Cr^{3+}$ doped Colquiriite mineral laser emission in a resonator mode in said $Cr^{3+}$ doped Colquiriite mineral host gain element to assure a responsive pumping thereof.

17. An apparatus according to claim 16 further including:
spacing said exterior face of said $Cr^{3+}$ doped Colquiriite mineral host gain element from said mirror to make the resonator mode waist small but not smaller than the pump mode waist to assure a responsive pumping thereof.

18. An apparatus according to claim 17 further including:

providing said mirror to have a radius of curvature which is approximately the same dimension as the spacing between said exterior face of said $Cr^{3+}$ doped Colquiriite mineral host gain element and said mirror to concentrate said reflected said $Cr^{3+}$ doped Colquiriite mineral emission in said resonator mode in said waist on said exterior face to assure a responsive pumping thereof.

* * * * *